United States Patent [19]
Teraoka et al.

[11] Patent Number: 5,848,950
[45] Date of Patent: Dec. 15, 1998

[54] DIFFERENTIAL GEAR CAPABLE OF DERIVING DIFFERENTIAL RESTRICTION FORCE BY FRICTIONAL RESISTANCE WITH ROTATIONS OF PINION AND SIDE GEARS

[75] Inventors: Masao Teraoka; Susumu Ishikawa; Nobushi Yamazaki; Shuhei Ono, all of Tochigi-Ken, Japan

[73] Assignee: Tochigi Fuji Sangyo Kabushiki Kaisha, Tochigi-Ken, Japan

[21] Appl. No.: 858,292

[22] Filed: May 19, 1997

Related U.S. Application Data

[63] Continuation of Ser. No. 501,709, Jul. 12, 1995, abandoned.

[30] Foreign Application Priority Data

Jul. 12, 1994 [JP] Japan .................................. 6-160381

[51] Int. Cl.⁶ .................................................. F16H 48/10
[52] U.S. Cl. ............................................ 475/252; 475/248
[58] Field of Search .................................... 475/248, 249, 475/252, 253

[56] References Cited

U.S. PATENT DOCUMENTS

| | | | |
|---|---|---|---|
| 5,194,054 | 3/1993 | Amborn et al. ........................ | 475/252 |
| 5,415,599 | 5/1995 | Cilano ..................................... | 475/252 |
| 5,433,673 | 7/1995 | Cilano ..................................... | 475/249 |
| 5,458,547 | 10/1995 | Teraoka et al. ........................ | 475/249 |

FOREIGN PATENT DOCUMENTS

| | | | |
|---|---|---|---|
| 0130806 | 1/1985 | European Pat. Off. ............... | 475/252 |
| 0563895 | 10/1993 | European Pat. Off. . | |
| 4013196 | 10/1991 | Germany ............................... | 475/252 |

*Primary Examiner*—Rodney H. Bonck
*Assistant Examiner*—Sherry Lynn Estremsky
*Attorney, Agent, or Firm*—Brown, Martin, Haller & McClain

[57] ABSTRACT

A differential gear transmitting force from an engine to a pair of wheels, includes a differential gear case receiving driving force of an engine and rotatably driven having a casing body and an end cover, a pair of side gears connected with the wheels respectively, pinion gears having a first gear portion meshed with the side gear and a second gear portion meshed with other pinion gear outside in the axial direction of the side gears, housing holes receiving each pinion gear slidably and rotatably and supporting a whole periphery of the second gear portion of the pinion gear except for a meshing portion meshed with other pinion gear, and a plate member fixed to the casing body and being able to bear the thrust force of the pinion gear.

7 Claims, 16 Drawing Sheets

DIFFERENTIAL GEAR CAPABLE OF DERIVING DIFFERENTIAL RESTRICTION FORCE BY FRICTIONAL RESISTANCE WITH ROTATIONS OF PINION AND SIDE GEARS

This is a continuation of application Ser. No. 08/501,709, filed Jul. 12, 1995, now abandoned.

BACKGROUND OF THE INVENTION

1. Field of the Invention

The present invention relates to a differential gear used for vehicles.

2. Description of the Related Art

"A restricted slip differential gear having a pair of roller pinions" as shown in FIG. 1 is disclosed in Japanese Laid-Open Patent Publication No. 49-104328, "a differential gear" as shown in FIG. 2 is disclosed in Japanese Laid-Open Patent Publication No. 61-165049, "a differential gear" as shown in FIG. 3 is disclosed in Japanese Laid-Open Patent Publication No. 60-175843, and "a method and an apparatus for changing the lock value" as shown in FIG. 4 is disclosed in Japanese Laid-Open Patent Publication No. 4-351354. These are differential gears 401, 403, 405 and 407 used for vehicles, as shown in respective drawings.

In respective differential units 401, 403, 405 and 407, the driving power of the engine for rotating the differential gear case 409, 411, 413 and 415 is distributed from each pinion gear 417, 419, 421, 423, 425, 427, 429, 431 to the wheel sides via each side gear 433, 435, 437, 439, 441, 443, 445 and 447, and differentially distributed between the wheels by the rotation of each pinion gear caused in response to the difference of the driving resistance between the wheels.

These pinion gears are housed in housing holes 449, 451, 453, 455, 457, 459, 461 and 463 provided on respective differential gear cases 409, 411, 423 and 415, and are supported slidably and rotatably, and when differential movements are caused, differential restriction force can be obtained by the friction resistance between each pinion gear and side gear and members which are in contact with these gears.

As shown in FIG. 1, the differential gear case 409 of the differential gear 401 is integrally formed, and the housing holes 449 and 451 are bored respectively from one side and from the other side in the axial direction. Furthermore, pinion gears 417 and 419 mesh with each other between the side gears 433 and 435.

As shown in FIG. 2, the differential gear case 411 of the differential gear 403 is so formed that the casing body 465 and the end cover 467 are fixed by a bolt 469. On the casing body 465 and the end cover 467, side wall portions 471 and 473 are formed, respectively. Furthermore, pinion gears 421 and 423 mesh with each other between the side gears 437 and 439.

As shown in FIG. 3, the differential gear case 413 of the differential gear 405 is composed of a casing body 475 and end covers 481 and 483 fixed by bolts 477 and 479 on right and left thereof. On each end cover 481 and 483, there are formed, respectively, side wall portions 485 and 487. Furthermore, pinion gears 425 and 427 mesh with each other between the side gears 441 and 443.

As shown in FIG. 4, the differential gear case 415 of the differential gear 407 is composed of a casing body 489 and end covers 495 and 497 fixed by bolts 491 and 493 on right and left thereof. On each end cover 495 and 497, there are formed, respectively, side wall portions 499 and 501. Furthermore, pinion gears 429 and 431 mesh with each other between the side gears 445 and 447.

Differential gear cases 409, 413 and 415 machine the housing holes 449, 451, 457, 459, 461 and 463 from both sides in the axial direction, respectively. Therefore, it is difficult to position the housing holes on the opposite sides in the axial direction. In addition, as described above, since each pinion gear meshes with each other between respective side gears, the wall face supporting the portion where pinion gears mesh with each other among respective housing holes, is machined by a tip portion of a drill, and an error is likely to be caused in the distance between the axial center of respective housing holes due to the flexure of the drill. When the error is caused, the action between each pinion gear is not performed normally, and poor differential movement and abnormal wears in pinion gears and housing holes are caused.

Furthermore, since there is provided a wide space only for the mesh portion of pinion gears between respective side gears, in the differential gear 401 shown in FIG. 1, a cross pin 503 for positioning respective side gears 433 and 435 against the differential gear case 409, and a snap ring 505 for fixing the cross pin 503 on the differential gear case 409 side are used, in the differential gear 403 shown in FIG. 2, a spacer 507 is arranged between side gears 437 and 439, and in the differential gear 405 shown in FIG. 3, a spacer pin 513 for keeping the interval between the shafts 509 and 511, and bolts for fixing the spacer pin 513 to the differential gear case 413 are used. Therefore, there are lot of parts to be used, respectively.

Furthermore, in the differential gears 403, 405 and 407, since bolts 469, 477, 479, 491 and 493 have an action to transmit the torque of the engine on the differential gear cases 411, 413 and 415, it is required to give them large diameters in order to impart sufficient strength. Accordingly, in order to make the device light, even if it is intended to make the differential gear case small, for example, by increasing the number of pairs of pinion gears and making the pinion gears have small diameters, the interference between the bolt and the pinion gear is caused, and the ratio of the sectional area of the bolt hole to the area of the side wall portion of the differential gear case becomes large, thereby the differential gear case may have insufficient strength. Because of these reasons, the diameter of the differential gear case cannot be made small sufficiently.

Furthermore, in the differential gear 401, closing plates 515 are fixed to the opening portion of each housing hole 449 and 451 by snap rings 517. These closing plates 515 are arranged to receive the thrust force, thereby opening for supplying oil to the pinion gears 417 and 419 cannot be provided. Moreover, in the differential gears 403, 405, and 407, since bolts have large diameters as described above, there is no room for providing wide openings for the oil other than the pinion gear-abutting portions on respective side wall portions 471, 473, 485, 487, 499 and 501.

In the differential gear case, openings for the oil are generally provided on the side wall portions and on cylindrical portions coupled to respective side wall portions. However, since the oil is sprung by the centrifugal force, the quantity of oil supplied from the opening on the cylindrical portion is small, and almost all oil to be supplied is the one bouncing off the wall face of the differential gear carrier which houses the differential gear and invading from the opening on the side wall portion. If the lubrication of each gear is insufficient, the friction resistance with the peripheral members becomes unstable, and the differential restriction property becomes unstable.

Because of the reasons described above, there are many problems due to the insufficient lubrication in the above-mentioned conventional examples which cannot provide wide openings on the side wall portions.

Moreover, in the differential gear 401, two large windows 519 are formed on the differential gear case 409 in order to assemble the side gears 433 and 435, which has a disadvantage in the strength. In addition, the integral differential gear case 409 on which the housing holes 449 and 451 are formed has a complicated shape, and is hard to be heat-treated. Furthermore, the method to machine the complicated differential gear case 409 having such a shape is restricted to, for example, casting or forging, and the precise finishing process of the supporting portions 521 and 521 of side gears 433 and 435 is difficult.

Furthermore, in the spacer 507 of the differential gear 403, there is formed a part of the housing holes 453 and 455, and the mesh portion of the pinion gears 421 and 423 is supported spreading over two members, the differential gear case 411 and the spacer 507. Accordingly, if there is a slight machining error of the spacer 507 or a slight assembly error to the differential gear case 411, irregular wears are caused and the differential restriction property becomes unstable due to the interference between pinion gears 421 and 423 and the spacer 507.

In the differential gear which obtains the differential restriction force by the friction resistance as the pinion gears and the side gears rotate, as in the conventional examples, side gears are supported by the action with pinion gears, thereby pinion gears have to be supported securely. Furthermore, the differential gear case having a complicated shape on which housing holes of pinion gears are formed is hard to be heat-treated, and it is also difficult to make the diameter small while maintaining the strength. Moreover, each gear has to be sufficiently lubricated in order to obtain a stable differential restriction property, while preventing burning and irregular wears.

However, there has heretofore been no such differential gear satisfying these conditions described above.

SUMMARY OF THE INVENTION

The object of the present invention, therefore, is to provide a differential gear which obtains the differential restriction force by the friction resistance as pinion gears and side gears rotate, in which pinion gears are supported securely, the strength of the differential gear case is large, the lubrication of the gear is sufficient, the differential restriction property is stable, and the number of parts is small.

The differential gear of the first invention is so constituted that to a casing body having a side wall portion on one side in the axial direction is fixed an end cover having a side wall portion on the other side in the axial direction, and includes a differential gear case which receives the driving force of the engine and is rotatably driven, a pair of side gears on the wheel side, pinion gears whose second gear portions mesh with each other outside in the axial direction of these side gears, and whose first gear portions mesh individually with side gears, housing holes which house each pinion gear slidably and rotatably and support the whole periphery except for the mesh portion of the second gear portion, and a plate member which is fixed to the casing body and is able to bear the thrust force of the pinion gear.

In the differential gear of the second invention, the plate member is fixed to the casing by a screw member.

In the differential gear of the third invention, engaging portions are provided in the plate member and the casing body which stop the casing body and the plate member, respectively, in the axial direction when they are relatively rotated, and after these engaging portion being engaged, the rotation of the plate member and the casing body are blocked by a detent.

In the differential gear of the fourth invention, the plate member is screwed to the casing body.

In the differential gear of the fifth invention, the plate member is opposite to the axial center portion of at least the end face of the pinion gear.

In the differential gear of the sixth invention, a rib-shaped convex portion in the axial direction which is the remaining portion of the machined housing holes of the pinion gears is formed in the casing body.

In the differential gear of the seventh invention, the pinion gear and the side gear are helical gears.

In the differential gear of each invention, a differential gear case is so constituted that a casing body having a side wall portion and an end cover are fixed, and a plate member is fixed to the side wall portion of the casing body so as not to impart the torque of the engine to bolts which assemble the differential gear case and to make the diameter of bolts small.

Since bolts have small diameters, any interference between bolts and pinion gears is not caused, thereby pinion gears can have small diameters to increase the number of pairs (for example, more than 3 pairs), and the differential gear case can be also made to have a small diameter to make it possible to make a differential gear small and light. Furthermore, there is a room for the side wall portion by making bolts have small diameters to increase the strength of the side wall portion and to make an opening for the oil wide, thereby gears are sufficiently lubricated and stable differential restriction property can be obtained.

Furthermore, when pinion gears are meshed at one side in the axial direction of the side gears, housing holes of the pinion gears can be machined to the casing body from one direction on the mesh side. Accordingly, differing from conventional examples which machine each housing hole from both sides, there is little positional error of each housing hole. Machining of these housing holes can be performed from either side of the end cover side or the plate member side according to the position of the mesh portion of pinion gears.

In addition, since wall faces of housing holes which support the mesh portion of pinion gears (second gear portion) are not machined by the tip portion of a drill, machining error due to the flexure of the tip portion of the drill can be avoided, differing from conventional examples. In addition, since the whole periphery of the second gear portion except for the mesh portion is supported by housing holes formed on the one-member (casing body), the action of pinion gears are maintained normal to make the differential restriction property stable as well as preventing the irregular wears of pinion gears and housing holes.

Furthermore, differing from conventional examples, since pinion gears mesh on the outside in the axial direction of side gears, a wide space between side gears is not formed. Accordingly, members such as a cross pin 503, a snap ring 505, a spacer 507, and a spacer pin 513 arranged between side gears are not required, thereby number of parts is small and it makes the differential gear light and low cost.

Plate members are fixed to the casing body to prevent pinion gears from falling down, and when each gear is composed of a helical gear, the plate member receives the thrust force of pinion gears.

In the second invention, the plate member is fixed to the casing body by a screw member. Since the plate member does not bear the torque of the engine, it is not necessary to make this screw member have a large diameter. Therefore, any interference between the screw member and pinion gears is not caused, and it does not hinder the differential gear case from having a small diameter. Furthermore, while increasing the strength of the side wall portion of the casing body, a wide opening for the oil can be formed on the side wall portion. Moreover, the bolt is light weight.

In the third invention, engaging portions are provided in the plate member and the casing body which are engaged with each other in the axial direction when they are relatively rotated, and after these engaging portions being engaged, the rotation of the plate member is blocked and fixed to the casing body by a detent. Thus, the plate member is easy to be assembled, thereby the number of assembly and the cost can be reduced.

In the fourth invention, the plate member is screwed to the casing body. In this case, the assembly of the plate member is simple, thereby the number of assembly and the cost can be reduced, and if the end portion of the pinion gear is pushed at the time of screwing, the initial torque (a certain differential restriction force) can be given, and this initial torque can be adjusted.

In the fifth invention, since the plate member is opposite to the axial center portion of at least the end face of the pinion gear, the plate member can securely receive the thrust force of the pinion gear. And when the gear teeth of the pinion gear is exposed between the plate member and the casing body, oil can be spread over directly to the gear teeth of the pinion gear, and the differential restriction property can be made further stable by sufficient lubrication.

In the sixth invention, a rib-shaped convex portion in the axial direction which is the remaining portion of the machined housing holes of pinion gears is formed in the casing body, and by the reinforcing effect of this rib-shaped convex portion, the strength of the casing body can be maintained high.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENTS

Figure 5:
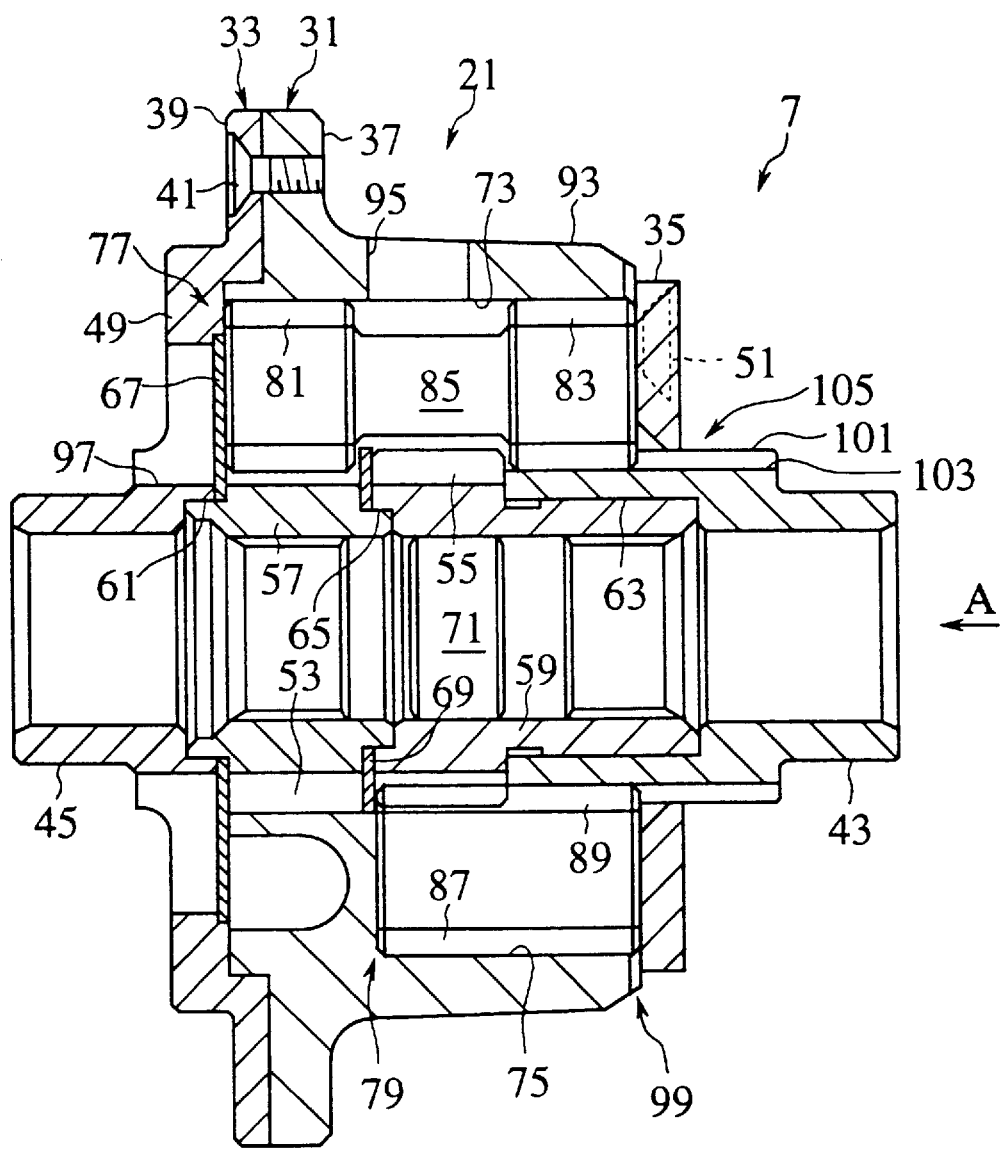
FIG. 5 is a sectional view showing the first embodiment of the second invention.
Figure 6:
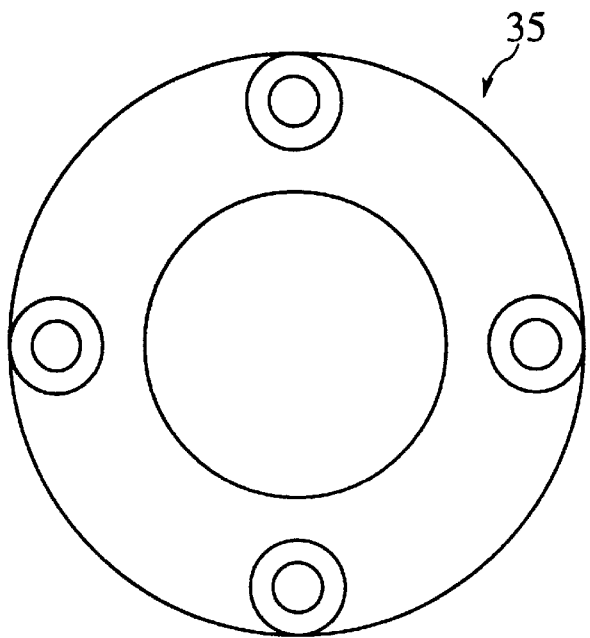
FIG. 6 is an elevational view of the ring plate used in the embodiment of FIG. 5.
Figure 7:
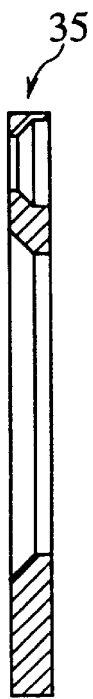
FIG. 7 is a side view of the ring plate used in the embodiment of FIG. 5.
Figure 17:
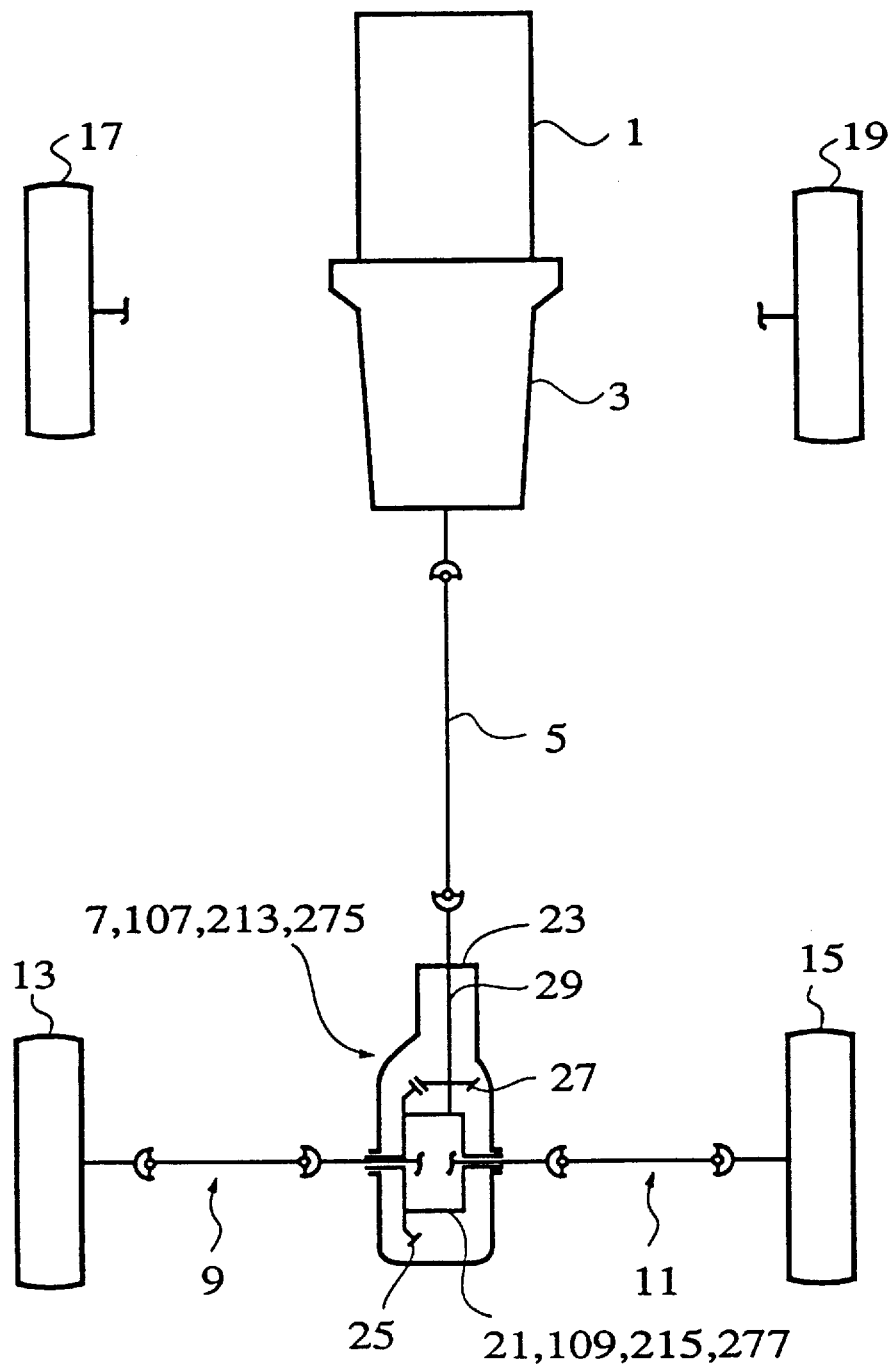
FIG. 17 is a view showing a skeleton mechanism of a power system of a vehicle using each embodiment.

The present invention will now be described with reference to the accompanied drawings. Though the differential gear of each embodiment is described as a rear differential gear used for FR-type vehicles, the differential gear of each embodiment may be a front differential gear, a center differential gear and the like. First, the first embodiment of the second invention will be described with reference to FIGS. 5–8 and 17. This embodiment includes characteristics of the fifth, sixth and seventh inventions. FIG. 5 shows this embodiment, and FIG. 17 shows the power system of the vehicle using each embodiment. The right and left direction is the right and left direction in this vehicle and in FIG. 5. Furthermore, members having no reference numerals are not shown.

As shown in FIG. 17, this power system comprises an engine 1, a transmission 3, a propeller shaft 5, a rear differential gear 7 (differential gear of FIG. 5 disposed on the rear wheels), rear shafts 9 and 11, rear wheels 13 and 15 on right and left, front wheels 17 and 19 on right and left.

The differential gear case 21 of the rear differential gear 7 is disposed rotatably in the differential gear carrier 23, a ring gear 25 is fixed to the differential gear case 21. The ring gear 25 is meshed with a driving pinion gear 27 which is integrally formed with a driving pinion shaft 29 coupled on the propeller shaft 5.

Thus, the driving force of the engine 1 rotates and drives the differential gear case 21 via the transmission 3 and the propeller shaft 5. An oil cup is formed in the differential gear carrier 23.

Figure 2:
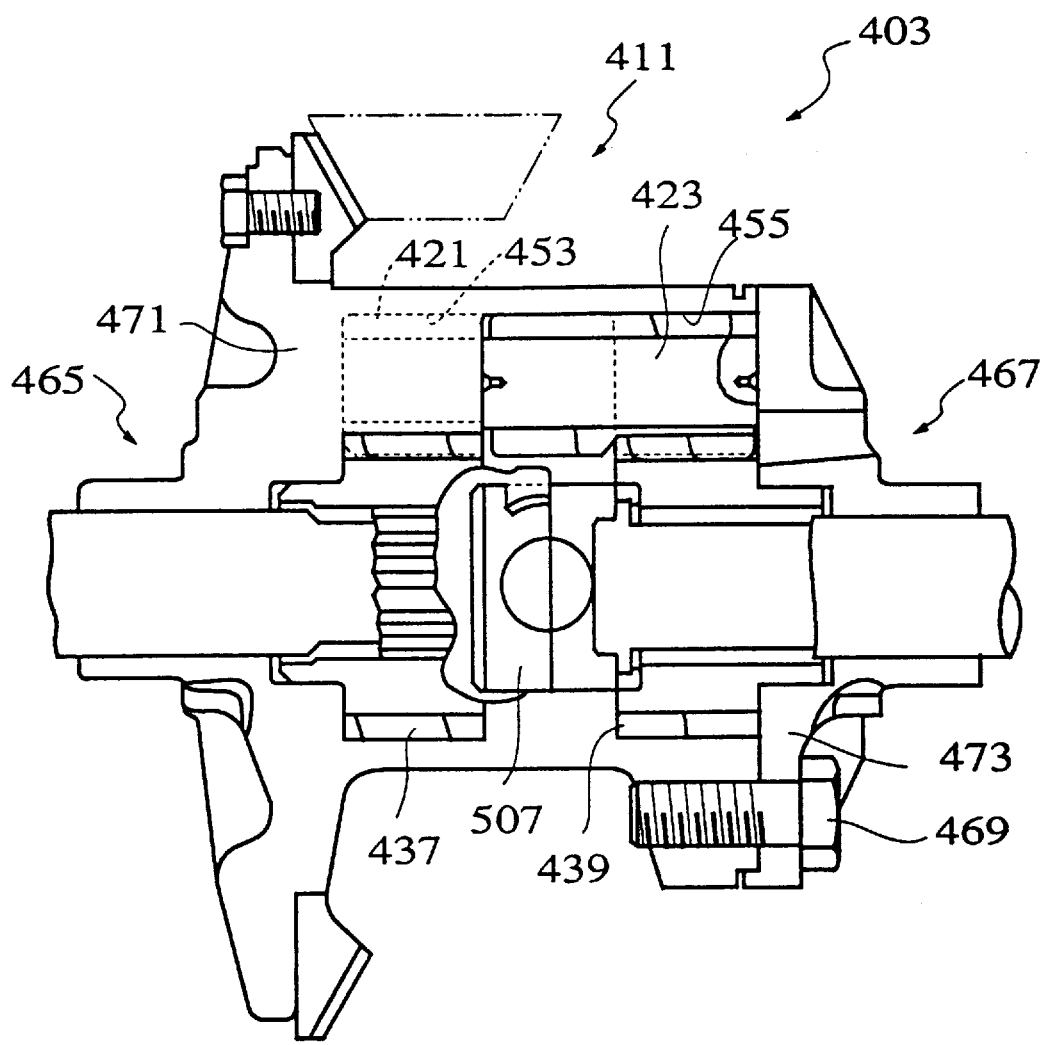
FIG. 2 is a sectional view showing the second conventional example.
Figure 3:
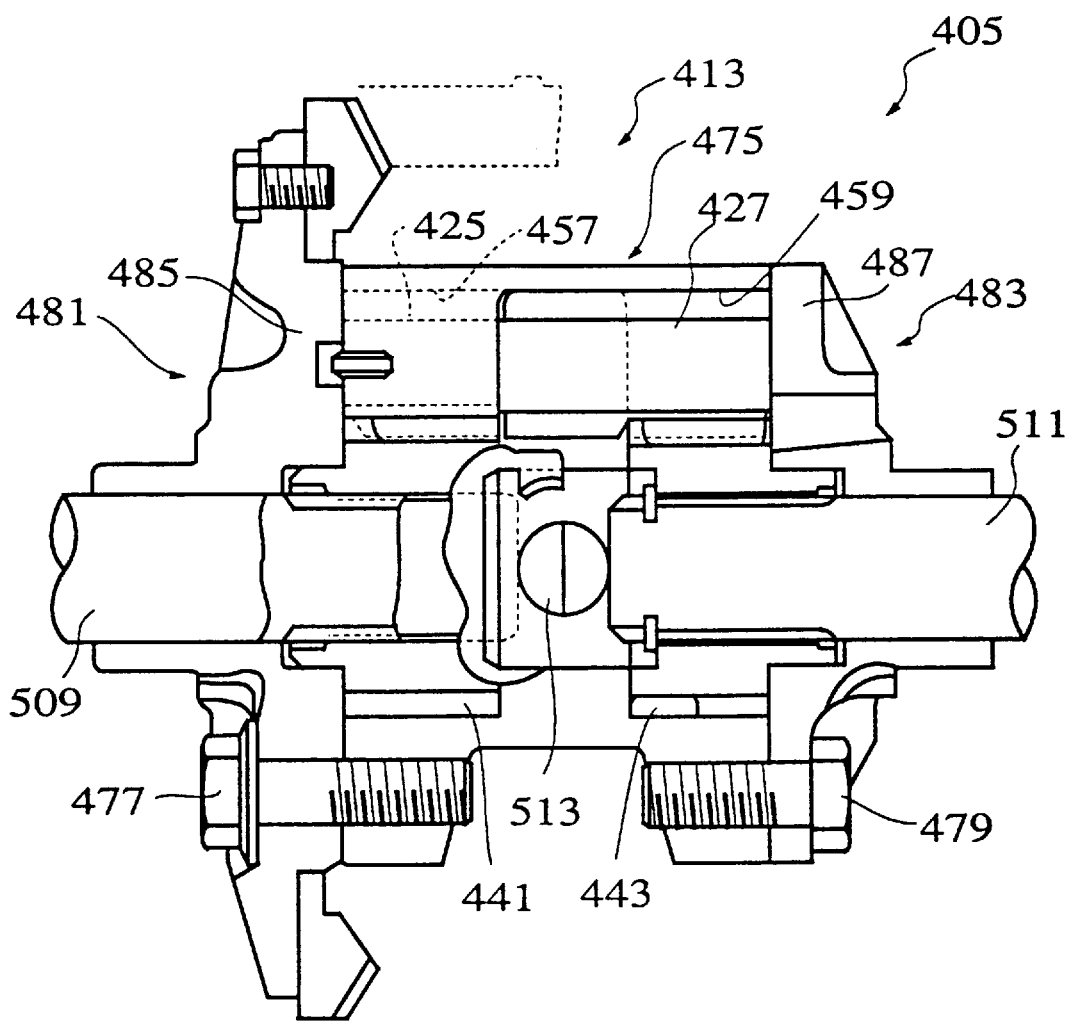
FIG. 3 is a sectional view showing the third conventional example.
Figure 4:
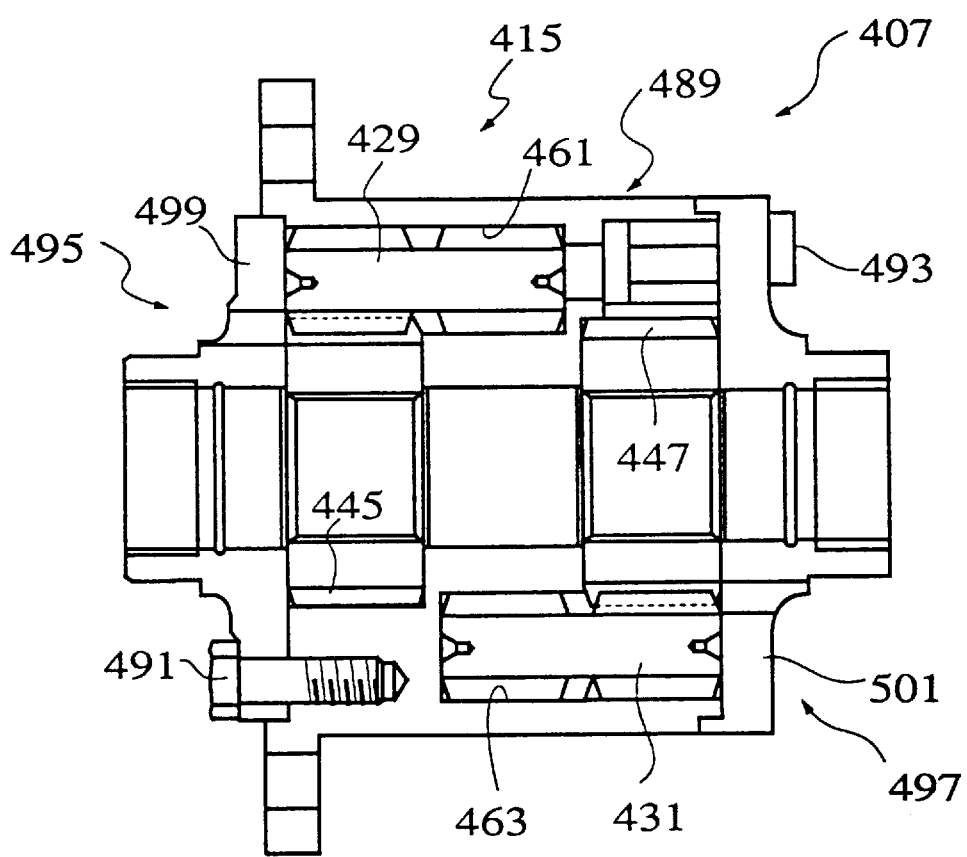
FIG. 4 is a sectional view showing the fourth conventional example.
Figure 8:
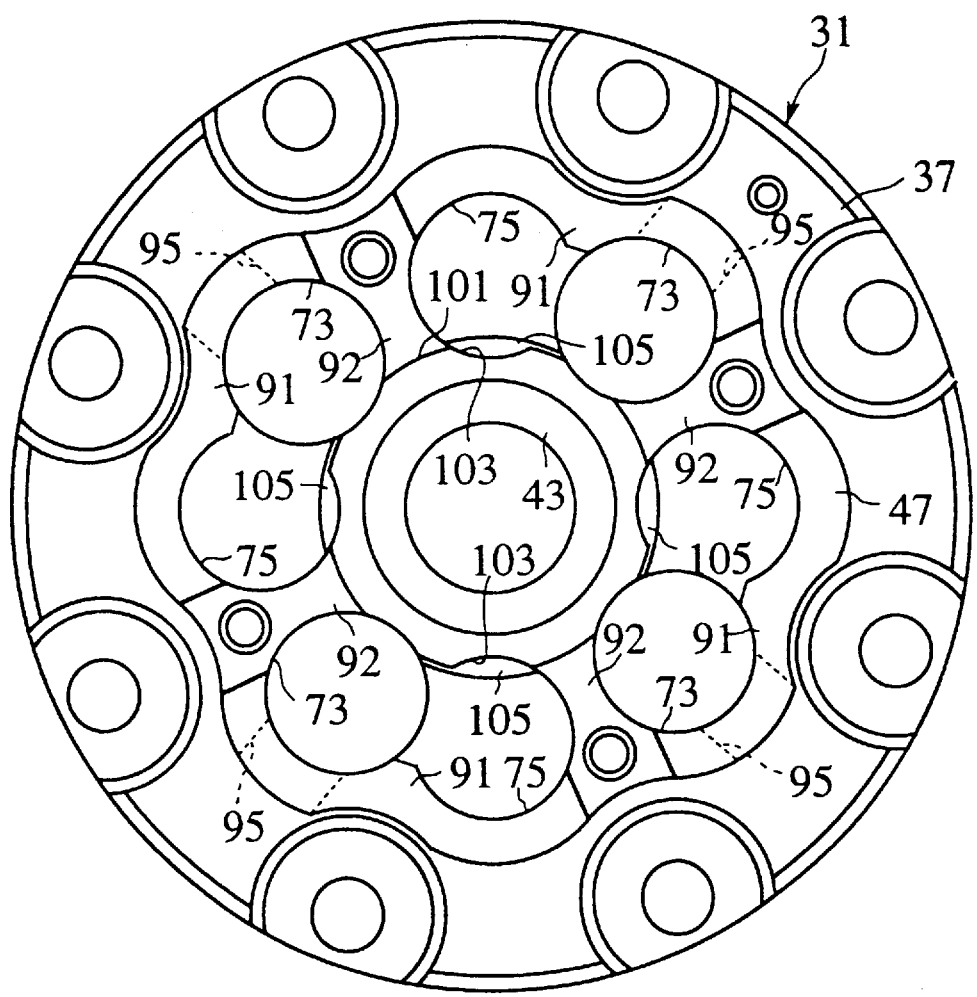
FIG. 8 is a view from the direction of arrow A excluding each gear and the ring plate from the embodiment of FIG. 5.

As shown in FIG. 5, the differential gear case 21 is composed of a casing body 31, an end cover 33, a ring plate 35 (plate member) and the like. The respective flange portions 37 and 39 of the casing body 31 and the end cover 33 are integrally fixed with two screws 41. Moreover they are fastened in common with a ring gear 25 by 8 bolts which fix the ring gear 25. Boss portions 43 and 45, and side wall portions 47 and 49 (the side wall portion 47 is shown in FIG. 8) are formed respectively on the casing body 31 and the end cover 33. The ring plate 35 is a plate member having a shape shown in FIGS. 2 and 3, and fixed to the side wall portion 47 of the casing body 31 by four bolts 51 (screw members).

As shown in FIG. 5, in the inside of the differential gear case 21, right and left helical side gears 53 and 55 are disposed. Respective side gears 53 and 55 are formed on the hollow bosses 57 and 59, respectively, and the boss 57 is supported by a supporting portion 61 formed on the boss portion 45 of the end cover 33, and the boss 59 is supported by a supporting portion 63 formed on the boss portion 43 of the casing body 31. Moreover, they are supported with each other via a supporting portion 65 formed therebetween, and are centered with each other.

Respective side gears 53 and 55 are spline-coupled with the rear wheels 9 and 11, respectively, via bosses 57 and 59 and fixed with a snap ring. Between the boss 57 and the end cover 33, a washer 67 is disposed. And in the inner periphery of the boss 59, a thrust block 71 to push the shafts 9 and 11 is disposed.

As shown in FIG. 5, long and short housing holes 73 and 75 are formed in four pairs with the same interval in the peripheral direction in the casing body 31, as shown in FIG. 8. They are machined from the right side of the casing body 31. In the housing holes 73 and 75, there are slidably and rotatably housed, respectively, long and short helical pinion gears 77 and 79. The ring plate 35 is disposed in the opening portion of the housing holes 73 and 75, so as to be brought into contact with the axial center portions of pinion gears 77 and 79.

The long pinion gear 77 comprises the first and second gear portions 81 and 83, a shaft portion 85 having a small diameter to couple these gear portions, the first gear portion 81 meshing with the left side gear 53. Furthermore, the short pinion gear 79 comprises the first and second gear portions 87 and 89, the first gear portion 87 meshing with the right side gear 55 and the second gear portion 89 meshing with the second gear portion 83 of the pinion gear 77.

As shown in FIG. 8, the whole periphery of the second gear portion 83 and 89 except for the mesh portion with each other is supported by housing holes 73 and 75 (casing body 31).

Furthermore, as shown in FIG. 8, rib-shaped convex portions 91 and 92 remaining after the housing holes 73 and 75 are machined is formed in the axial direction on the casing body 31.

Four openings 95 are provided on the cylindrical portion 93 of the casing body 31, as shown in FIG. 8, and oil flows in via these openings 95 from the oil cup of the differential gear carrier 23. Furthermore, a plurality of openings 97 are provided on the side wall portion 49 of the end cover 33, and in the casing body 31, a clearance 99 is formed between the outer periphery side of the ring plate 35 and the side wall portion 47. And, a clearance 105 is formed between a concave portion 103 (FIG. 8) of a rib 101 formed on the outer periphery of the boss portion 43 and the inner periphery side of the ring plate 35.

From these openings 97 and clearances 99 and 105, the oil sprung from the inner wall of the differential gear carrier 23 flows in as the rear differential gear 7 rotates. Lubrication of the mesh portions and supporting portions of respective gears 53, 55, 77 and 79 is performed with the inflow oil.

The driving force of the engine 1 for rotating the differential gear case 21 is distributed to the rear wheels 13 and 15 on left and right via pinion gears 77 and 79 through side gears 53 and 55. And when there is caused a difference in the driving resistance between rear wheels, the driving force of the engine 1 is differentially distributed to the right and left sides by the rotation of pinion gears 77 and 79.

During the transmission of the torque, the pinion gears 77 and 79 are pushed to the wall face of the housing holes 73 and 75 by the reaction force in the action with the side gears 53 and 55 to cause the friction resistance. Furthermore, the friction resistance is caused among the end cover 33, the casing body 31 and the ring plate 35 with respect to pinion gears 77 and 79 by the acting thrust force of the helical gear, and the friction resistance is caused among side gears 53 and 55, washers 67 and 69, and the casing body 31. The differential restriction force of the torque-responsive type is obtained by these friction resistance.

In the vehicle in FIG. 17, the behavior of the car body when the torque is applied becomes stable to improve the operability by the differential restriction function of the rear differential gear 7.

Thus, the differential mechanism 7 is constituted.

As described above, with respect to the rear differential gear 7, the torque of the engine 1 is not imposed on the screw 41 which assembles the differential gear case 21 and a bolt 51 which attaches the ring plate 35, differing from the conventional examples, thereby the diameters of the screw and bolt can be made small.

Since the bolt 51 has a small diameter, the diameters of pinion gears 77 and 79 can be made small without causing any interference between the bolt 51 and pinion gears 77 and 79, the number of pairs can be increased to four, and the rear differential gear 7 can be made small and light by making the diameter of the differential gear case small. Furthermore, the bolt 51 having a small diameter is light, which makes the rear differential gear 7 light.

Even if the diameter of the differential gear case 21 is made small, the strength thereof can be maintained high by the rib-shaped convex portions 91 and 92 formed on the casing body 31.

Since pinion gears 77 and 79 are meshed on the one side (on the right side) in the axial direction of side gears 53 and 55, the housing holes 73 and 75 can be machined from the right side (the one side) of the casing body 31. Therefore, differing from the conventional examples in which each housing hole is machined from both sides in the axial direction, there is little positional error between the housing holes 73 and 75.

Furthermore, the wall face of housing holes 73 and 75 which support the mesh portion (the second gear portions 83 and 89) of pinion gears 77 and 79 is machined with the base of the drill (chuck side), the machining error due to the flexure of the tip portion of the drill can be avoided, differing from the conventional examples. In addition, the whole periphery of the second gear portions 83 and 89 except for the mesh portion is supported by housing holes 73 and 75 formed on one member (casing body 31).

As described above, since there is little positional error between housing holes 73 and 75, and the second gear portions 83 and 89 are composed of only one member, and the whole periphery except for the mesh portion is supported, the action of pinion gears 77 and 79 can be kept normal to make the differential restriction property stable, as well as preventing the irregular wears of pinion gears 77 and 79 and housing holes 73 and 75.

Furthermore, differing from conventional examples, members such as a cross pin 503, a snap ring 505, a spacer 507 and a spacer pin 513 disposed between side gears 53 and 55 are not necessary, and the number of parts is small, thereby the differential gear is light and low cost.

Figure 1:
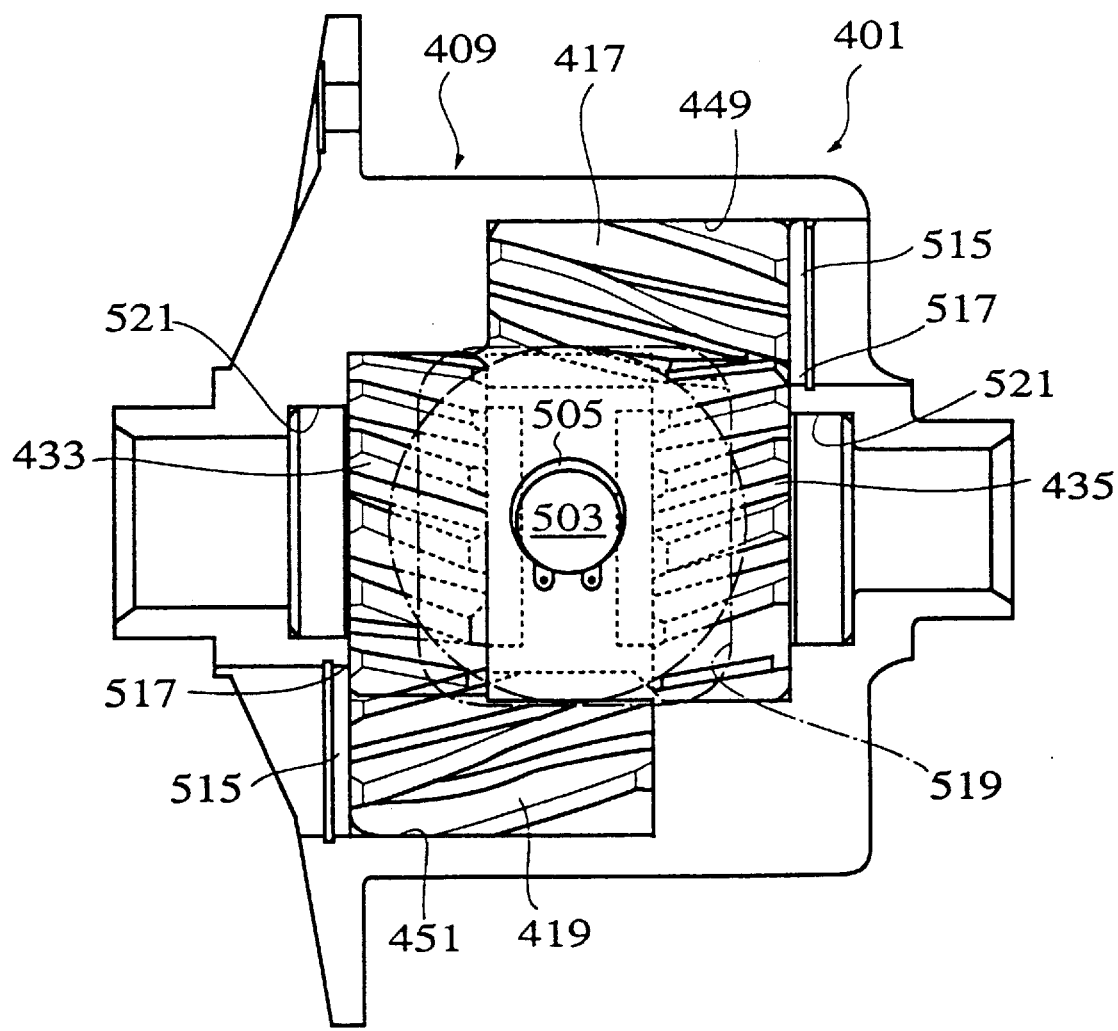
FIG. 1 is a sectional view showing the first conventional example.

Furthermore, differing from the conventional example in FIG. 1, the differential gear case 21 is not integrally formed, thereby the casing body 31 has a simple shape and the heat treatment thereof is easy.

Next, the second embodiment of the second invention will be described with reference to FIGS. 9–13. This embodiment includes characteristics of the fifth, sixth and seventh inventions. This embodiment is a vehicle shown in FIG. 17 and used as a rear differential gear 107. The right and left direction is the right and left direction in this vehicle and in FIGS. 9 and 10. Furthermore, members having no reference numerals are not shown.

The differential gear case 109 of the rear differential gear 107 is disposed rotatably in the differential gear carrier 23, and a ring gear 25 is fixed to the differential gear case 109.

The differential gear case 109 is composed of a casing body 111, an end cover 113, a ring plate 115 (plate member) and the like. The respective flange portions 117 and 119 of the casing body 111 and the end cover 113 are integrally fixed with two screws 121. Moreover they are fastened in common with a ring gear 25 by 10 bolts which fix the ring gear 25.

Boss portions 123 and 125, and side wall portions 127 and 129 are formed respectively on the casing body 111 and the end cover 113. The ring plate 115 is fixed to the side wall portion 127 of the casing body 111 by four bolts 131 (screw members).

Figure 9:
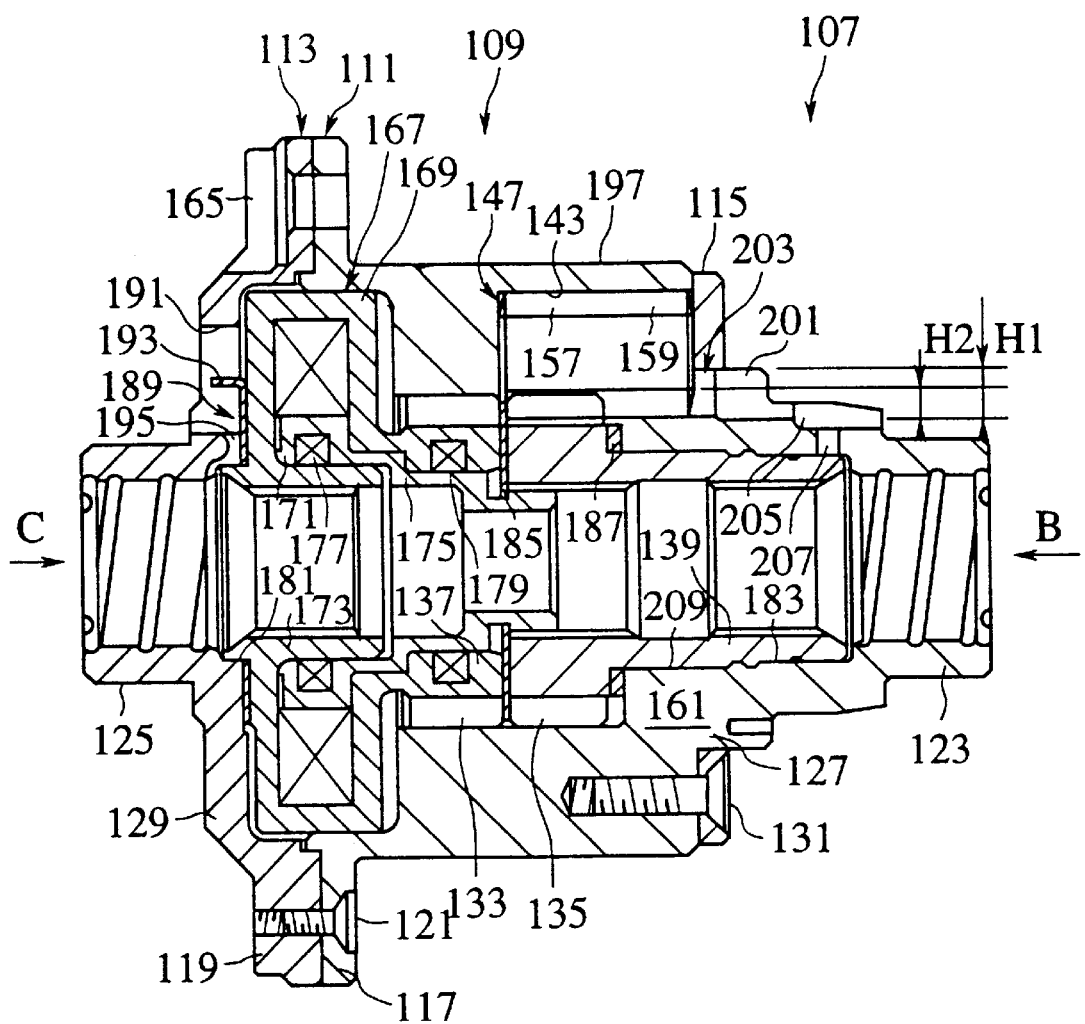
FIG. 9 is a sectional view showing the second embodiment of the second invention.

As shown in FIG. 9, in the inside of the differential gear case 109, right and left helical side gears 133 and 135 are disposed. Respective side gears 133 and 135 are formed on the hollow bosses 137 and 139, respectively.

Figure 10:
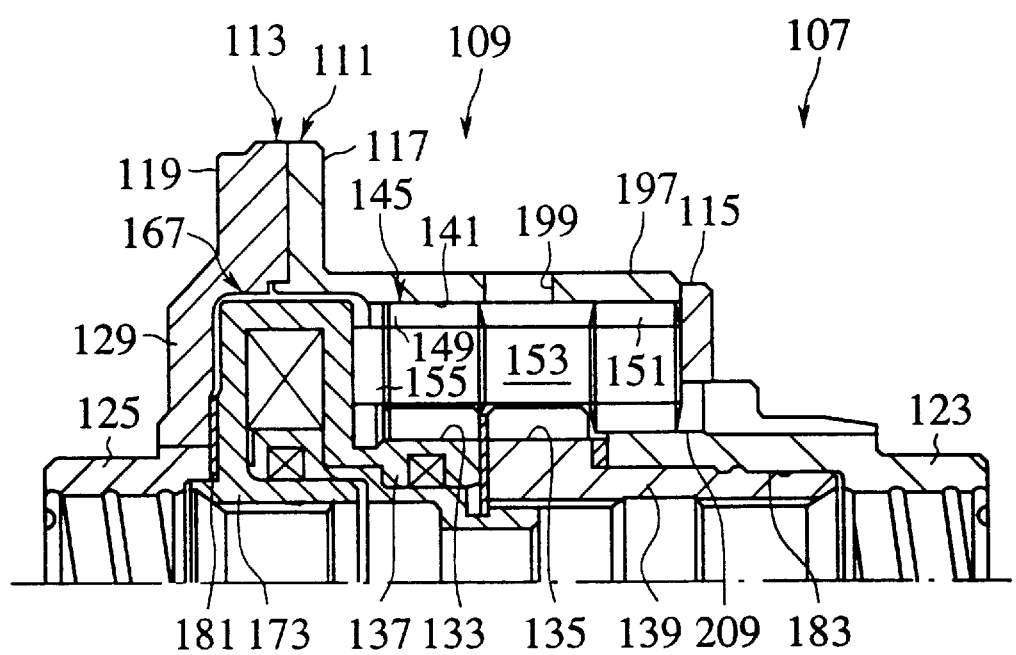
FIG. 10 is a sectional view of the second embodiment which is cut on the face different from FIG. 9.

As shown in FIGS. 9 and 10, long and short housing holes 141 and 143 are formed in the casing body 111. They are machined from the right side of the casing body 111. In the housing holes 141 and 143, there are slidably and rotatably housed, respectively, long and short helical pinion gears 145 and 147. The ring plate 115 is disposed in the opening portion of the housing holes 141 and 143, so as to be brought into contact with the axial center portions of pinion gears 145 and 147.

The long pinion gear 145 comprises the first and second gear portions 149 and 151, a shaft portion 153 having a small diameter to couple these gear portions, and a convex portion 155 formed on the left side of the first gear portion 149, the first gear portion 149 meshing with the left side gear 133. Furthermore, the short pinion gear 147 comprises the first and second gear portions 157 and 159 integrally formed, the first gear portion 157 meshing with the right side gear 135 and the second gear portion 159 meshing with the second gear portion 151 of the pinion gear 145.

The whole periphery of the second gear portions 151 and 159 except for the mesh portion is supported by housing holes 141 and 143 (casing body 111).

Figure 11:
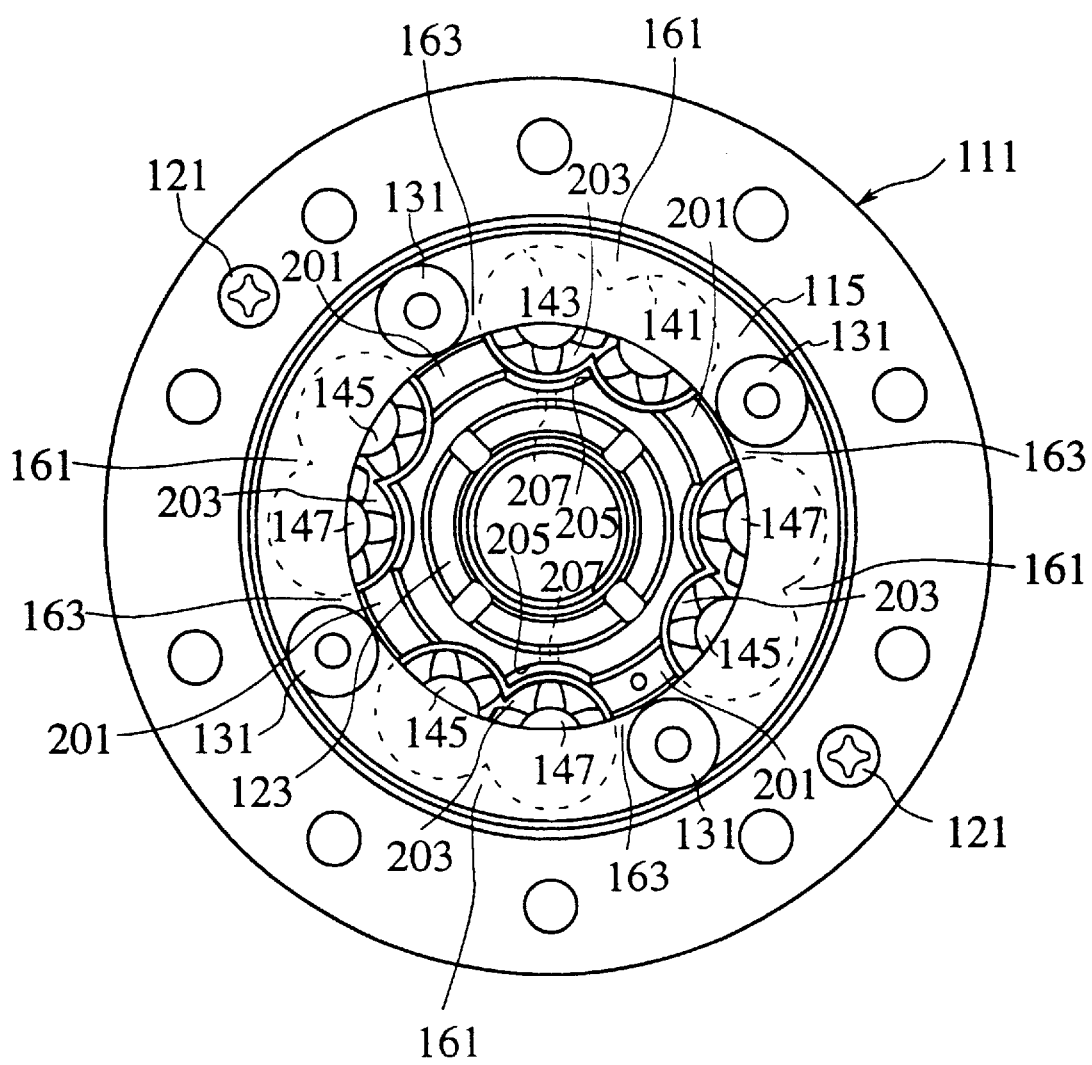
FIG. 11 is a view from the direction of arrow B in FIG. 9.
Figure 12:
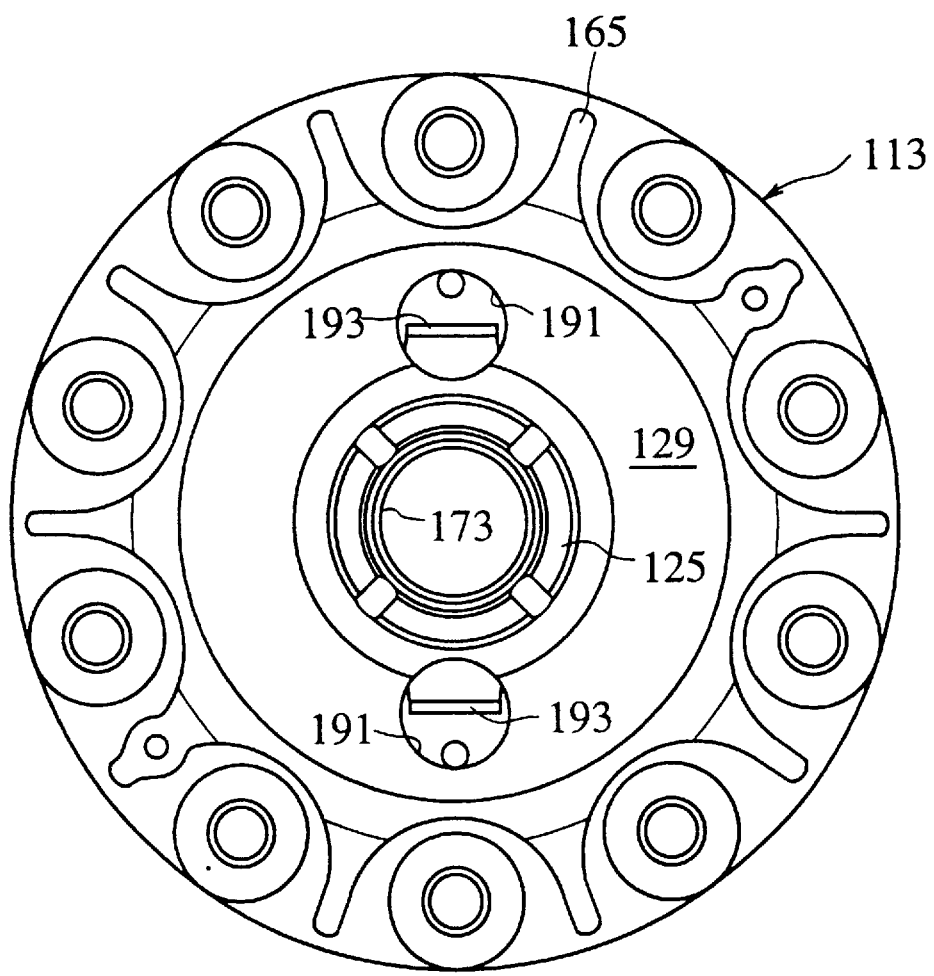
FIG. 12 is a view from the direction of arrow C in FIG. 9.

Furthermore, as shown in FIGS. 9 and 11, rib-shaped convex portions 161 and 163 remaining after the housing holes 141 and 143 are machined is formed in the axial direction on the casing body 111. Moreover, as shown in FIG. 12, a reinforcement rib 165 is formed on the end cover 113.

A coupling 167 is disposed between the casing body 111 and the end cover 113, which is the differential restriction mechanism of a speed-responsive type for restricting the differential movement in response to the differential rotation speed.

This coupling 167 includes a housing 169 and a hub 171 disposed inside thereof, and the housing 169 is integrally formed with the boss 137 of the left side gear 133 and the boss 173 on the shaft side. Furthermore, the hub 171 is spline-coupled to the boss 139 of the right side gear 135 via a coupling portion 175 extending through the bosses 137 and 173. Between the hub 171 and the boss 173, and between the boss 137 and the coupling portion 175, seals 177 and 179 are disposed, respectively.

The boss 173 on the left side gear 133 side is supported by the supporting portion 181 of the end cover 113, and the boss 139 on the right side gear 135 side is supported by the supporting portion 183 of the casing body 111. The boss 173 is spline-coupled to the left rear shaft 13, and the boss 139 is spline-coupled to the right rear shaft 15.

A washer 185 is disposed between the boss 137 and the boss 139, and a washer 187 is disposed between the boss 139 and the casing body 111. Furthermore, a washer 189 is disposed between the housing 169 and the end cover 113 of the coupling 167. As shown in FIG. 12, openings 191 for oil are disposed in two places on the end cover 113, and the rotation of the washer 189 is blocked by turning two claws thereof 193 into these openings 191, respectively. Moreover, the end cover 113 is provided with a notch 195 for introducing oil which is connected to the opening 191.

As shown in FIG. 10, an opening 199 is formed in the cylindrical portion 197 of the casing body 111, and oil flows from the oil cup of the differential gear carrier 23 through this opening 199.

Furthermore, as shown in FIG. 9, a rib-shaped convex portion 201 which remains after the housing holes of the pinion gears are machined is provided on the outer periphery of the boss portion 123 of the casing body 111, and the inner periphery of the ring plate 115 is abutting against this rib 201. The height H1 of the rib 201 is set higher than the height H2 of the gear teeth of pinion gears 145 and 147. And as shown in FIGS. 9 and 11, an exposed portion 203 longer than the height H2 of the gear teeth of pinion gears 145 and 147 in the radial direction is formed on the inner periphery side of the ring plate 115, and from this exposed portion 203, the mesh portion of pinion gears 145 and 147 (the second gear portions 151 and 159) is exposed. Moreover, the rib 201 is provided with a tool groove 205 for pulling out the bearing, and the tool groove 205 is provided with an introducing hole 207 for lubrication.

From said opening 191, exposed portion 203, and introducing hole 207 described above, the oil sprung from the inner wall of the differential gear carrier 23 flows into the inside of the differential gear case 109 as the rear differential gear 107 rotates. With the oil flown into, the lubrication of the mesh portions and supporting portions of each gear 133, 135, 145 and 147 is performed. Furthermore, between the boss 139 of the right side gear 135 and the casing body 111, a clearance 209 having a slightly larger diameter than the supporting portion 183 is formed, and draws the oil flown from the introducing hole 207 into the inside (the left side) of the differential gear case 109 by the centrifugal force.

The driving force of the engine 1 for rotating the differential gear case 109 is distributed to the rear wheels 13 and 15 on left and right via pinion gears 145 and 147 through side gears 133 and 135. And when there is caused a difference in the driving resistance between rear wheels, the driving force of the engine 1 is differentially distributed to the right and left sides by the rotation of pinion gears 145 and 147.

During the transmission of the torque, the pinion gears 145 and 147 are pushed to the wall face of the housing holes 141 and 143 by the reaction force in the action with the side gears 133 and 135 to cause the friction resistance. Furthermore, the friction resistance is caused between the housing 169 of the coupling 167, the casing body 111 and the ring plate 115 with respect to pinion gears 145 and 147 by the acting thrust force of the helical gear, and the friction resistance is caused among side gears 133 (housing 169) and 135, washers 185, 187 and 189, and the casing body 111. The differential restriction force of the torque-responsive type is obtained by these friction resistance.

On the other hand, the coupling 167 restricts the differential movement in response to the differential rotation speed between the rear wheels.

In the vehicle in FIG. 17, the behavior of the car body when the torque is applied becomes stable to improve the operability by the differential restriction function of the rear differential gear 107, and when one wheel runs idle due to a bad state of the road, the driving force is transmitted to the rear wheel on the grip side by the differential restriction function of the coupling 167 to improve the travelling performance.

Thus, the differential mechanism 107 is constituted.

As in the rear differential gear 7 of the above embodiment, with respect to the rear differential gear 107, the torque of the engine 1 is not imposed on the screw 121 and the bolt 131, the diameters of the screw and bolt can be made small. Since the diameter of bolt 131 can be made small, the diameter of the differential gear case 109 can be made small and the rear differential gear can be made small and light, without causing any interference between the bolt 131 and pinion gears 145 and 147. Moreover, even if the diameter of the differential gear case 109 is made small, the strength can be maintained high by the rib-shaped convex portion 161, 163 and 201.

Furthermore, since housing holes 141 and 143 can be machined from the right side (the one side) of the casing body 111, there is little positional error therebetween. Moreover, the wall face of the housing holes 141 and 143 which support the mesh portion of pinion gears 145 and 147 (the second gear portions 151 and 159) is machined with the base of the drill, the machining error due to the flexure of the tip portion of the drill can be avoided. In addition, the whole periphery of the second gear portions 151 and 159 except for the mesh portion is supported by housing holes 141 and 143 formed on one member (casing body 111).

Therefore, the action of pinion gears 145 and 147 can be kept normal to make the differential restriction property stable, as well as preventing the irregular wears of pinion gears 145 and 147 and housing holes 141 and 143.

Furthermore, differing from conventional examples, members such as a cross pin 503 and a spacer 507 disposed between side gears 133 and 135 are not necessary, and the number of parts is small, thereby the differential gear is light and low cost.

Furthermore, even if a differential restriction device such as the coupling 167 is integrated, the integrated space 211 can be formed by casting, and machining of housing holes 141 and 143 of pinion gears 145 and 147, and the housing space of side gears 133 and 135 can be performed similarly as in the machining process of the differential gear case 21 shown in FIG. 5 in which the coupling 167 does not exist. Furthermore, the differential gear case 109 is not integrally formed, thereby the casing body 111 has a simple shape and the heat treatment thereof is easy.

Next, one embodiment of the third invention will be described with reference to FIGS. 13, 14 and 17. This embodiment includes characteristics of the fifth, sixth and seventh inventions. This embodiment is a vehicle shown in FIG. 17 and used as a rear differential gear 213. The right and left direction is the right and left direction in this vehicle and in FIG. 13. Furthermore, members having no reference numerals are not shown. In addition, members of the above-mentioned embodiment (rear differential gear 7) and members with the same function are given the same reference numerals and referred to, and description of these members having the same functions is omitted.

The differential gear case 215 is composed of a casing body 217, an end cover 219, a ring plate 221 (plate member) and the like. The respective-flange portions 223 and 225 of the casing body 217 and the end cover 219 are integrally fixed with two screws 227. Moreover they are fastened in common with a ring gear 25 by 10 bolts which fix the ring gear 25. Boss portions 229 and 231, and side wall portions 233 and 235 are respectively formed on the casing body 217 and the end cover 219.

Figure 14:
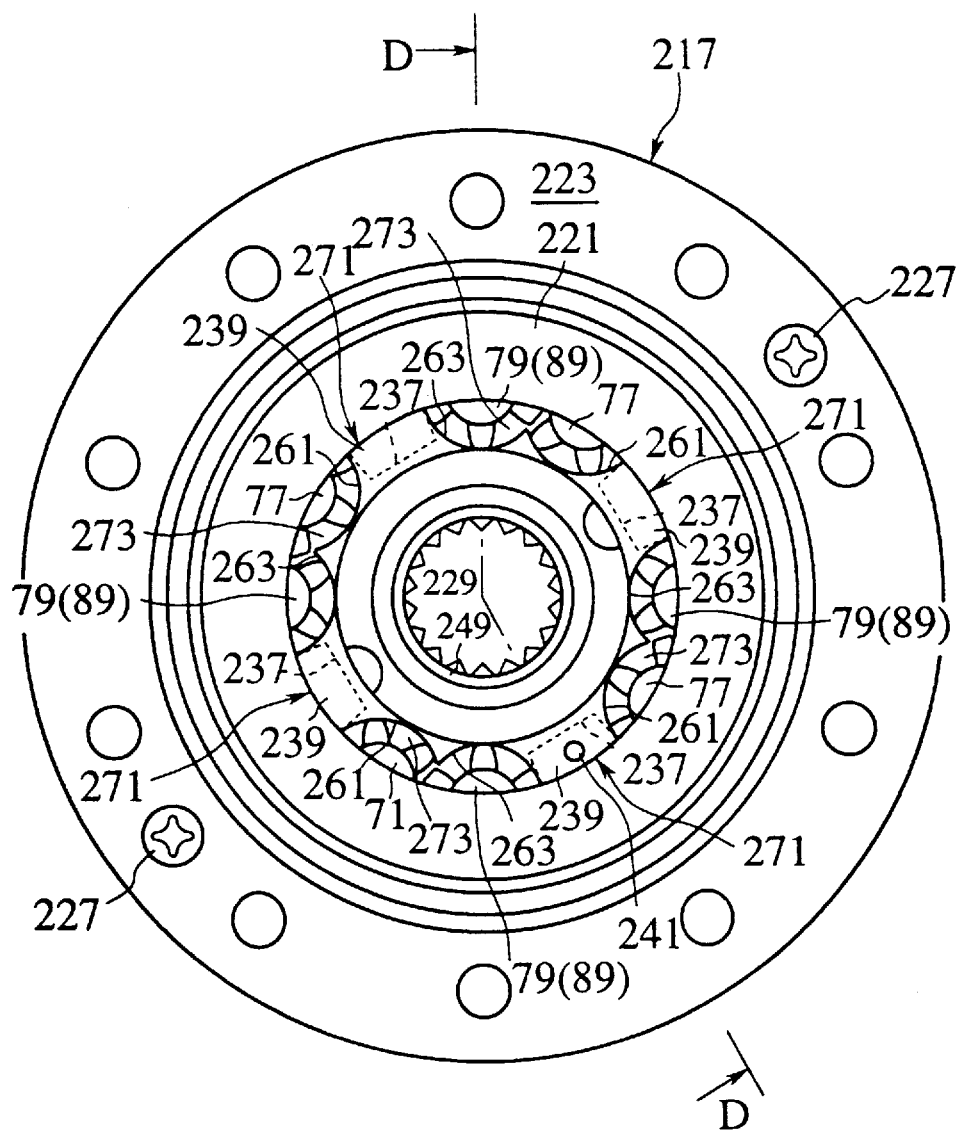
FIG. 14 is a view from the direction of arrow E in FIG. 13.

As shown in FIG. 14, four convex portions 237 (engaging portions) are formed with the same interval on the inner periphery of the ring plate 221, and engaging grooves (engaging portions) which engage with each convex portion 237 in the axial direction are provided in four places on the side wall portion 233 of the casing body 217. The ring plate 221 rotates the convex portion 237 to be meshed with the engaging groove 239, while pushing the convex portion 237 to the side wall portion 233, thereafter stops the rotation thereof with a pin 241 (a detent member).

Figure 13:
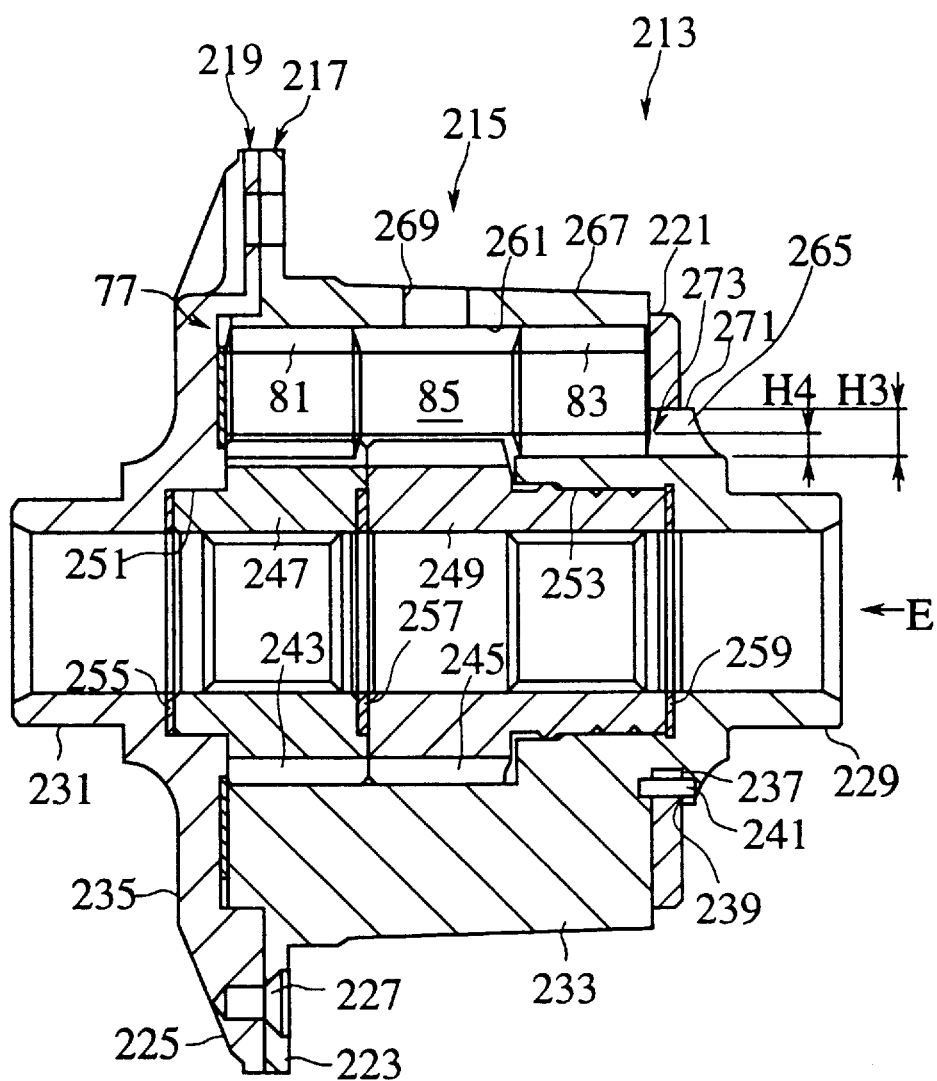
FIG. 13 is a sectional view showing one embodiment of the third invention.

As shown in FIG. 13, in the inside of the differential gear case 215, right and left helical side gears 243 and 245 are disposed. Respective side gears 243 and 245 are formed on the hollow bosses 247 and 249, respectively, and the boss 247 is supported by a supporting portion 251 formed on the boss portion 231 of the end cover 219, and the boss 249 is supported by a supporting portion 253 formed on the boss portion 229 of the casing body 217.

Respective side gears 243 and 245 are spline-coupled with the rear wheels 9 and 11, respectively, via bosses 247 and 249 and fixed with a snap ring. Washers 255, 257 and 259 are disposed, respectively, between the boss 247 and the end cover 219, between bosses 247 and 249, and between the boss 249 and the casing body 217.

As shown in FIGS. 13 and 14, long and short housing holes 261 and 263 are formed in four pairs with the same interval in the peripheral direction in the casing body 217. They are machined from the right side of the casing body 217. In the housing holes 261 and 263, there are slidably and rotatably housed, respectively, long and short helical pinion gears 77 and 79. The ring plate 221 is disposed in the opening portion of the housing holes 261 and 263, so as to be brought into contact with the axial center portions of pinion gears 77 and 79.

The first gear portion 81 of the long pinion gear 77 meshes with the left side gear 243, and the first gear portion of the short pinion gear 79 meshes with the right side gear 245. The whole periphery of the second gear portions 83 and 89 of pinion gears 77 and 79 except for the mesh portion with each other is supported by housing holes 261 and 263 (casing body 217).

Furthermore, as shown in FIG. 13, a rib-shaped convex portion 265 remaining after the housing holes 261 and 263 are machined is formed in the axial direction on the casing body 217.

Four openings 269 are provided on the cylindrical portion 267 of the casing body 217, and oil flows in via these openings 269 from the oil cup of the differential gear carrier 23. Furthermore, a plurality of openings are provided on the side wall portion 235 of the end cover 219.

The outer periphery of rib 271 which forms said engaging groove 239 in the casing body 217 is, abutting against the inner periphery of the ring plate 221. The height H3 of the rib 271 is set higher than the height H4 of the gear teeth of pinion gears 77 and 79. And as shown in FIGS. 9 and 10, an exposed portion 273 longer than the height H4 of the gear teeth of pinion gears 77 and 79 in the radial direction is formed on the inner periphery side of the ring plate 221, and from this exposed portion 273, the mesh portion of pinion gears 77 and 79 (the second gear portions 83 and 89) is exposed.

From the opening of the end cover 219 and the exposed portion 273, the oil sprung from the inner wall of the differential gear carrier 23 flows in as the rear differential gear 213 rotates. Lubrication of the mesh portions and supporting portions of respective gears 77, 79, 243 and 245 is performed with the inflow oil.

The driving force of the engine 1 for rotating the differential gear case 215 is distributed to the rear wheels 13 and 15 on left and right via pinion gears 77 and 79 through side gears 243 and 245. And when there is caused a difference in the driving resistance between rear wheels, the driving force of the engine 1 is differentially distributed to the right and left sides by the rotation of pinion gears 77 and 79.

During the transmission of the torque, the pinion gears 77 and 79 are pushed to the wall face of the housing holes 261 and 263 by the reaction force in the action with the side gears 243 and 245 to cause the friction resistance. Furthermore, the friction resistance is caused between the end cover 219, the casing body 217 and the ring plate 221 with respect to pinion gears 77 and 79 by the acting thrust force of the helical gear, and the friction resistance is caused among side gears 243 and 245 and washers 255 (end cover 219), 257 and 259 (casing body 217). The differential restriction force of the torque-responsive type is obtained by these friction resistance.

Thus, the rear differential gear 213 is constituted.

In the vehicle in FIG. 17, the behavior of the car body when the torque is applied becomes stable to improve the operability by the differential restriction function of the rear differential gear 213.

With respect to the rear differential gear 213, since bolts are not used to the place where the torque of the engine 1 is imposed, the diameters of the differential gear case 215 can be made small and the rear differential gear 213 can be made small and light, without causing any interference between bolts and pinion gears 77 and 79. Moreover, even if the diameter of the differential gear case 215 is made small, the strength can be maintained high by the rib-shaped convex portion 265 formed on the casing body 217.

Furthermore, since housing holes 261 and 263 can be machined from the right side (the one side) of the casing body 217, there is little positional error therebetween. Moreover, the wall face of the housing holes 261 and 263 which support the mesh portion of pinion gears 77 and 79 (the second gear portions 83 and 89) is machined with the base of the drill, thereby the machining error due to the flexure of the tip portion of the drill can be avoided. In addition, the whole periphery of the second gear portions 83 and 89 except for the mesh portion with each other is supported by housing holes 261 and 263 formed on one member (casing body 217).

Therefore, the action of pinion gears 77 and 79 can be kept normal to make the differential restriction property stable, as well as preventing the irregular wears of pinion gears 77 and 79 and housing holes 261 and 263.

Furthermore, differing from conventional examples, members such as a cross pin 503 and a spacer 507 disposed between side gears 243 and 245 are not necessary, and the number of parts is small, thereby the differential gear is light and low cost.

The assembly of the ring plate 221 which is stopped by engaging with the casing body 217 only by twisting is simple, thereby the number of assembly and the cost can be reduced.

Next, one embodiment of the fourth invention will be described with reference to FIGS. 15, 16 and 17. This embodiment includes characteristics of the fifth, sixth and seventh inventions. This embodiment is a vehicle shown in FIG. 17 and used as a rear differential gear 275. The right and left direction is the right and left direction in this vehicle and in FIG. 15. Furthermore, members having no reference numerals are not shown. In addition, members of the above-mentioned embodiment (rear differential gear 213) and members with the same function are given the same reference numerals and referred to, and description of these members having the same functions is omitted.

The differential gear case 277 is composed of a casing body 279, an end cover 219, a ring plate 281 (plate member) and the like. The respective flange portions 283 and 225 of the casing body 279 and the end cover 219 are integrally fixed with two screws 227. Moreover they are fastened in common with a ring gear 25 by 10 bolts which fix the ring gear 25. The boss portion 285 and the side wall portion 287 are formed on the casing body 279.

The ring plate 281 is screwed to the top portion of the ribs 289 formed in four places on the outer periphery of the boss portion 285 of the casing body 279.

In the inside of the differential gear case 277, right and left helical side gears 243 and 245 are disposed, and the boss 249 of the right side gear 245 is supported by a supporting portion formed in the boss portion 285 of the casing body 279. A washer 259 is disposed between the boss 249 and the casing body 279.

Figure 15:
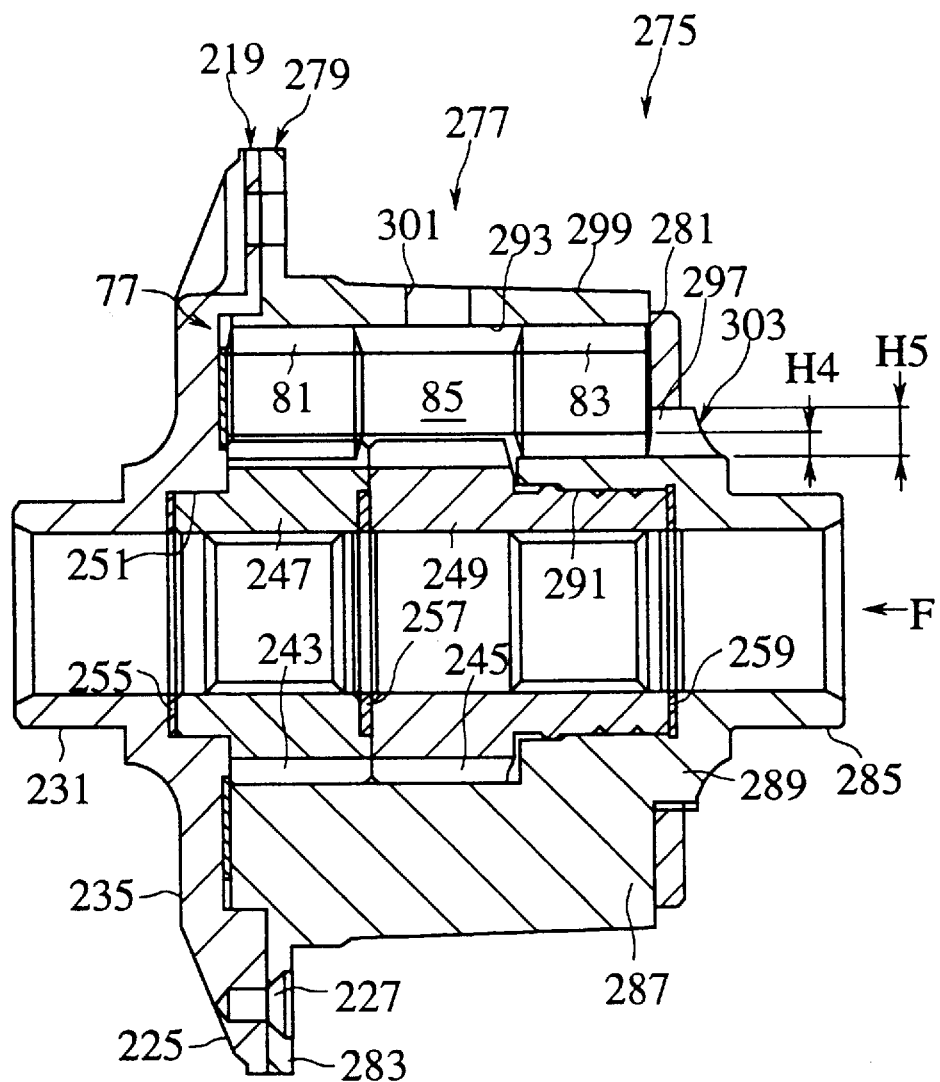
FIG. 15 is a sectional view showing one embodiment of the fourth invention.
Figure 16:
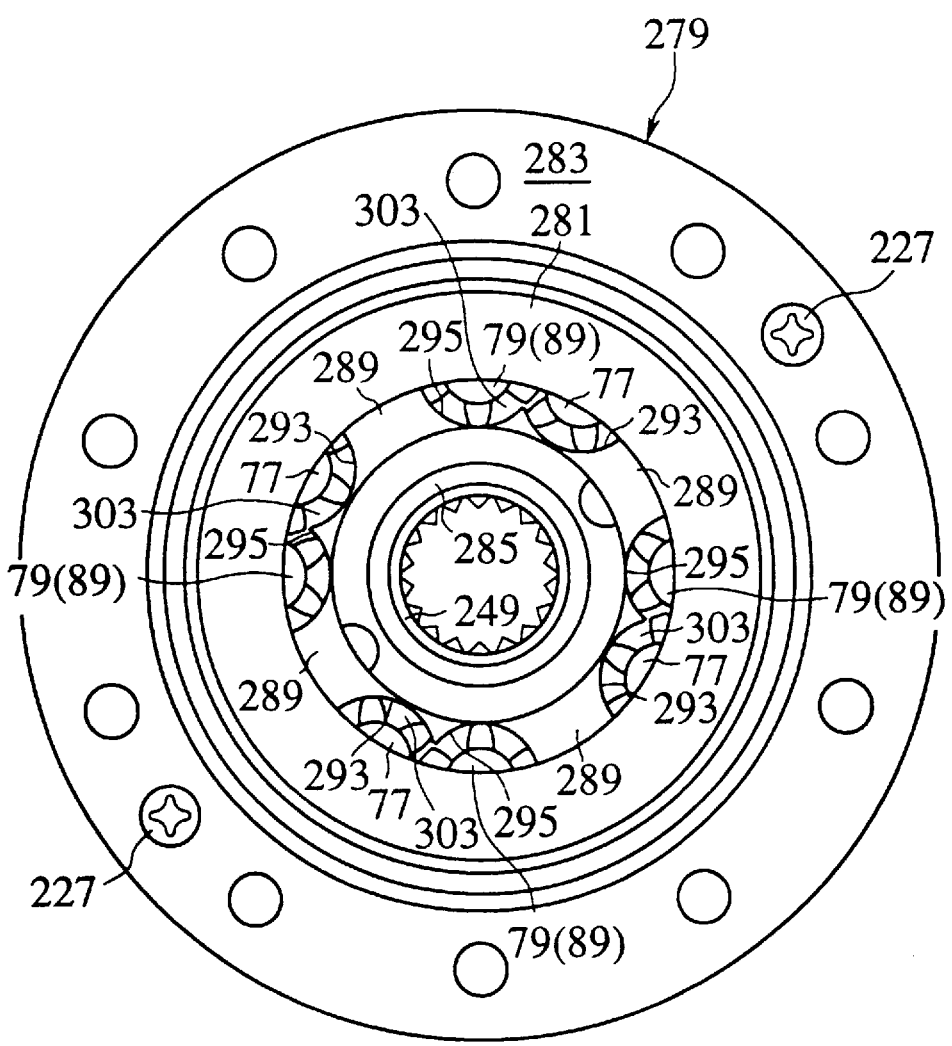
FIG. 16 is a view from the direction of arrow F in FIG. 15.

As shown in FIGS. 15 and 16, long and short housing holes 293 and 295 are formed in four pairs with the same interval in the peripheral direction in the casing body 279. They are machined from the right side of the casing body 279. In the housing holes 293 and 295, there are slidably and rotatably housed, respectively, long and short helical pinion gears 77 and 79.

The ring plate 281 is disposed in the opening portion of the housing holes 293 and 295, so as to be brought into contact with the axial center portions of pinion gears 77 and 79. Moreover, after being screwed to the rib 289, the ring plate 281 is fixed by staking to push the end portion of pinion gears 77 and 79, thereby the initial torque (certain differential restriction force) can be given to pinion gears 77 and 79, and this initial torque can be adjusted.

The whole periphery of the second gear portions 83 and 89 of pinion gears 77 and 79 except for the mesh portion with each other is supported by housing holes 293 and 295 (casing body 279). A rib-shaped convex portion 297 remaining after the housing holes 293 and 295 are machined is formed in the axial and radial directions on the casing body 279.

Four openings 301 are provided on the cylindrical portion 299 of the casing body 279, and oil flows in via these openings 301 from the oil cup of the differential gear carrier 23. Furthermore, a plurality of openings are provided on the side wall portion 235 of the end cover 219.

The height H5 of the rib 289 of the casing body 279 is set higher than the height H4 of the gear teeth of pinion gears 77 and 79. And as shown in FIGS. 11 and 12, an exposed portion 303 longer than the height H4 of the gear teeth of pinion gears 77 and 79 in the radial direction is formed on the inner periphery side of the ring plate 281, and from this exposed portion 303, the second gear portions 83 and 89 are exposed.

From the opening of the end cover 219 and the exposed portion 303, the oil sprung from the inner wall of the differential gear carrier 23 flows in as the rear differential gear 275 rotates. Lubrication of the mesh portions and supporting portions of respective gears 77, 79, 243 and 245 is performed with the inflow oil.

Thus, the rear differential gear 275 is constituted.

The rear differential gear 275 distributes the driving force of the engine 1 to the rear wheels 13 and 15 on left and right, and when there is caused a difference in the driving resistance between rear wheels, the driving force of the engine 1 is differentially distributed to the right and left sides.

During the transmission of the torque, the differential restriction force of the torque-responsive type can be obtained by the friction resistance caused by the acting reaction force which is received by pinion gears 77 and 79, and the acting thrust force of the helical gear which is received by gears 77, 79, 243 and 245. In addition, a certain differential restriction force can be obtained by the initial torque given to pinion gears 77 and 79 by the ring plate 281. As described above, this initial torque can be adjusted.

In the vehicle in FIG. 17, the behavior of the car body when the torque is applied becomes stable to improve the operability by the differential restriction function of the torque-responsive type of the rear differential gear 275, and when one of the rear wheels 13 and 15 runs idle due to the bad state of the road, the driving force is transmitted to the rear wheel on the other side by the initial torque to improve the travelling performance.

Furthermore, as in the rear differential gear 213 of the above-mentioned embodiment, the diameters of the differential gear case 277 can be made small and the rear differential gear 275 can be made small and light, without causing any interference between bolts and pinion gears 77 and 79. Moreover, even if the diameter of the differential gear case 277 is made small, the strength can be maintained high by the rib-shaped convex portion 297.

Furthermore, housing holes 293 and 295 can be machined from the right side (the one side) of the casing body 279, thereby the positional error between them is little. Also, the machining error of the wall face of housing holes 293 and 295 which support the mesh portion of pinion gears 77 and 79 (the second gear portions 83 and 89) due to the flexure of the tip portion of the drill can be avoided, and additionally, the whole periphery of the second gear portions 83 and 89 except the mesh portion can be supported by housing holes 293 and 295 formed on one member (casing body 279).

Thus, the action of pinion gears 77 and 79 can be kept normal, the differential restriction property can be made stable, and irregular wears of pinion gears 77 and 79 and housing holes 293 and 295 can be prevented.

Furthermore, differing from conventional examples, members such as a cross pin 503 and a spacer 507 disposed between side gears 243 and 245 are not necessary, and the number of parts is small, thereby the differential gear is light and low cost.

The assembly of the ring plate 281 which is screwed to the casing body 279 only by twisting is simple, thereby the number of assembly and the cost can be reduced.

In addition, side gears and pinion gears may not be helical gears but may be spur gears.

The differential gear of each invention fixes the casing body and the end cover which have side wall portions respectively, and plate members are fixed to the side wall portion of the casing body to constitute the differential gear case, thus the torque of the engine is not imposed on the bolts which assemble the differential gear case.

Accordingly, diameters of bolts can be made small, and the number of pairs can be increased (for example, to more than three pairs) by making the diameter of the pinion gear small, without causing any interference between bolts and pinion gears, thereby the differential gear can be made small and light. Moreover, there is a room for the side wall portion by making diameters of bolts small, the strength of the side wall portion is increased and an opening for the oil can be made wide, thereby gears are sufficiently lubricated and stable differential restriction property can be obtained.

Furthermore, when pinion gears are meshed on the one side in the axial direction of the side gears, housing holes of the pinion gears can be machined to the casing body from one direction on the mesh side. Accordingly, differing from conventional examples in which each housing hole is machined from both sides, there is little positional error of each housing hole.

In addition, the wall face of the housing holes which support the mesh portion of pinion gears (the second gear portion) can avoid the machining error due the flexure of the tip portion of the drill, while the whole periphery of the second gear portion except for the mesh portion with each other is supported by housing holes formed in one member (casing body), thereby the action of pinion gears can be kept normal to further improve the stability of the differential restriction property, as well as preventing irregular wears of pinion gears and housing holes.

Furthermore, since there is not formed a large space between side gears, a large member disposed between side gears is not required, thereby the number of parts can be made small, and the differential gear can be made light and low cost.

In the second invention, the torque of the engine is not imposed on the screw member which fixes the plate member to the casing body, thereby it is not required to make the diameter of the screw member large. Accordingly, it is not hindered to make the diameter of the differential gear case small without causing any interference between the screw member and pinion gears. In addition, the strength of the side wall portion of the casing body can be increased, and a wide opening for the oil can be formed on the side wall portion.

In the third invention, after the plate member is engaged with the casing body by an engaging portion, the plate member is prevented from rotating with a detent member, thereby the assembly is simple, and the number of assembly and the cost can be reduced.

In the fourth invention, the assembly of the plate member screwed to the casing body is simple, and the number of assembly and the cost can be reduced, while pushing the end portion of the pinion gear to give an initial torque thereto at the time of screwing, and this initial torque can be adjusted.

In the fifth invention, the plate member is opposite to the axial center portion of the end face of the pinion gear and can receive securely the thrust force, and it is possible to splash the oil directly to the gear teeth of the pinion gear from between the plate member and the casing body to sufficiently lubricate the pinion gear, thus the differential restriction property can be made stable, in the sixth invention, the strength of the casing body can be maintained high by the reinforcing effect of the rib-shaped convex portion which remains in the casing body after machining of housing holes.

Although some preferred embodiments of the invention have been described above by way of example only, it will be understood by those skilled in the field that modifications may be made to the disclosed embodiments without departing from the scope of the invention, which is defined by the appended claims.

We claim:

1. A differential gear for transmitting driving force from an engine to a pair of wheels, comprising:

a differential case driven by a driving force of an engine, said differential case having an axis;

a first side gear rotatably received in said differential case along said case axis, said first side gear having means for connecting said side gear to a first wheel;

a second side gear rotatably received in said differential case along said case axis, said second side gear having means for connecting said second side gear to a second wheel;

a first pinion gear received in said differential case and having an axis spaced outwardly from said side gears, said first pinion gear having a first gear portion meshed with said first side gear and a second gear portion;

a second pinion gear received in said differential case and having an axis spaced outwardly from said side gears, said second pinion gear having a first gear portion meshed with said second side gear and a second gear portion meshed with said second gear portion of said first pinion gear;

said second gear portions of said first and second pinion gears being located outside in the axial direction of said first and second side gears;

said differential case including a casing body having a cylindrical portion, a flange portion formed outside said cylindrical portion, and a boss portion formed on one end in the axial direction of said cylindrical portion for supporting one of said side gears;

said cylindrical portion having first and second housing holes for slidably and rotatably receiving therein said first and second pinion gears, respectively;

said second gear portions having a meshing portion in which said second gear portions of said first and second pinion gears are meshed with each other;

said first and second housing holes comprising means for supporting the whole periphery of said first and second pinion gears except for said meshing portion;

a plate member fixed to said cylindrical portion of said casing body and comprising means for bearing a thrust force of said first and second pinion gears by contacting end faces of the first and second pinion gears at a radially outer portion thereof, said plate member having an inner portion spaced from said boss portion to provide a clearance, whereby said first and second housing holes are open to the outside of said differential case through said clearance; and an end cover having a flange portion fixed to the flange portion of said casing body, a side wall portion comprising means for supporting a thrust force of said pinion gears, and a boss portion for supporting the other of said side gears.

2. The differential gear as claimed in claim 1, wherein said plate member is fixed to said casing body by a screw member.

3. The differential gear as claimed in claim 1, further comprising engaging means for engaging said plate member with said casing body so as to prevent movement of said plate member in the axial direction of said casing body, and a locking member for preventing rotation of said plate member relative to said casing body after said plate member is engaged with said casing body by said engaging means, said engaging means and locking means together comprising means for fixing said plate member to said casing body.

4. The differential gear as claimed in claim 1, wherein said plate member is screwed to said casing body.

5. The differential gear as claimed in claim 1, wherein said first and second pinion gears each have an end face with a central portion, and said plate member faces at least the central portion of the end face of each of said first and second pinion gears.

6. The differential gear as claimed in claim 1, wherein said casing body has a rib-shaped portion extending in an axial direction, said rib-shaped portion being formed as a remaining portion after said first and second housing holes are formed in said casing body.

7. The differential gear as claimed in claim 1, wherein said first and second pinion gears and said first and second side gears are helical gears.

* * * * *